United States Patent [19]
Gourdine et al.

[11] 3,991,710
[45] Nov. 16, 1976

[54] ELECTROGASDYNAMIC PRODUCTION LINE COATING SYSTEM

[75] Inventors: Meredith C. Gourdine, Fort Lee; Stephen Diamond, Livingston; Donald Porter, Carlstadt, all of N.J.

[73] Assignee: Energy Innovations, Inc., East Orange, N.J.

[22] Filed: June 1, 1973

[21] Appl. No.: 366,121

[52] U.S. Cl. .................... 118/634; 118/630; 239/15; 317/3
[51] Int. Cl.² .................................... B05B 5/02
[58] Field of Search .......... 117/17, 93.4; 118/621, 118/627, 629, 630, 631, 632, 633, 634, 635, 2, 8; 239/3, 15; 317/3

[56] References Cited
UNITED STATES PATENTS

| | | | |
|---|---|---|---|
| 2,442,986 | 6/1948 | Ransburg | 118/634 |
| 2,527,501 | 10/1950 | Saks | 117/33 |
| 2,550,657 | 4/1951 | Ransburg | 118/630 |
| 2,730,460 | 1/1956 | Ransburg | 118/634 |
| 2,805,642 | 9/1957 | Tuttle et al. | 118/635 |
| 2,847,324 | 8/1958 | Ogint | 118/634 |
| 2,919,170 | 12/1959 | Epstein | 346/74 |
| 3,000,752 | 9/1961 | Jackson et al. | 117/17 |
| 3,048,498 | 8/1962 | Juvinall et al. | 117/93 |
| 3,133,833 | 5/1964 | Giaimo | 118/637 |
| 3,248,253 | 4/1966 | Barford et al. | 117/17 |
| 3,323,934 | 6/1967 | Point | 117/17 |
| 3,498,540 | 3/1970 | Adams | 239/15 |
| 3,593,308 | 7/1971 | Fagan | 118/2 X |
| 3,630,441 | 12/1971 | Felici et al. | 239/15 |
| 3,687,368 | 8/1972 | Geberth, Jr. | 239/15 |
| 3,739,742 | 6/1973 | Racz | 118/8 |
| 3,757,491 | 9/1973 | Gourdine | 239/3 |

*Primary Examiner*—Mervin Stein
*Attorney, Agent, or Firm*—Brumbaugh, Graves, Donohue & Raymond

[57] ABSTRACT

A coating system for efficient electrical precipitation of powder to articles. Articles are conveyed through a coating chamber where they are coated with a powder. Electrogasdynamic guns direct a cloud of charged particles into the coating chamber. Dilution air moves the cloud through the chamber with the articles. As the cloud moves with the articles, the charged particles precipitate to the articles. An exhaust section draws off the dilution air as the coated articles leave the chamber. Electrically conductive articles may be grounded through the conveyor system to provide a discharge path from the charged particles. For non-conducting or hard to ground articles, a precharge section places on the articles an initial charge of opposite polarity from the charged particles. A powder feed using a cylinder and piston arrangement to contain fluidized powder supplies a uniform powder suspension to the guns.

23 Claims, 17 Drawing Figures

ELECTROGASDYNAMIC PRODUCTION LINE COATING SYSTEM

BACKGROUND OF THE INVENTION

This invention relates to a production line coating system for coating a series of articles with particles.

Coating systems are known that have varying degrees of effectiveness. With a fluidized bed system a preheated article is agitated within a mass of the coating powder. Agitation of the articles is necessary to insure that the coating powder enters and adheres in recesses in the surface of the article. The minimum coating thickness is usually 10 mils and accurate temperature control is required to maintain uniform thickness among the articles. With a large article, a thickness gradient may be present, resulting in a heavier coating on the bottom than on the top, whereas a small article is difficult to coat.

Electrostatic fluidized beds usually require voltages ranging from 60 to 90 kilovolts, which present safety problems. Electrostatic shielding due to charge build up at sharp edges of articles, makes such beds ill suited for workpieces with small recesses.

Flocking guns are known, but require that the articles be preheated. Additionally, the coating uniformity is largely dependent on the skill of the operator. With these, as well, there is difficulty getting powder into recesses. Obtaining a uniform coating, and preventing a large overspray are further problems.

Electrostatic spray guns similarly require high voltages and are usually quite expensive. Again the uniformity of coating depends on the skill of the operator, and the electrostatic shielding effect makes it difficult to coat within deep recesses.

Electrogasdynamic coating is described in U.S. Pat. No. 3,673,463, granted to one of the present inventors. That disclosure is not specifically directed to the particular problems of production line coating.

SUMMARY OF THE INVENTION

There is provided, in accordance with the present invention, an apparatus for coating articles moving in a production line that overcomes that problems previously mentioned.

The articles to be coated are conveyed through a coating area. Means are provided for producing a cloud of charged particles. Air is moved down the path of article movement. The cloud moves with and precipitates onto the articles.

A coating chamber has an opening for receiving the articles and an opening for permitting the coated articles to exit the chamber. The chamber has three basic sections, a space charge section into which electrogasdynamic (EGD) guns discharge, a precipitation section downstream of the guns where the charged particles move with an precipitate onto the workpieces, and an exhaust section where the dilution air is drawn off and any remaining airborne powder is removed from the vicinity of the articles. In the space charge section, the EGD guns emit a turbulent electrogasdynamically charged cloud into the coating chamber. The turbulent cloud insures that the particles uniformly coat the articles including any recesses. Grounding or reversely precharging the article helps overcome electrostatic shielding at its surface. The precipation section is formed by dielectric walls the interior of which may be conductive and at a high potential of the same polarity as the charge on the particles. Baffles at the opening of exhaust conduits in the exhaust section can prevent turbulence from blowing off powder that has precipitated to the articles.

Each EGD gun has a pair of electrodes that forms a corona discharge to charge the powder that passes the electrodes in the form of a suspension of powder in air. The suspension is formed by a means, a venturi for example, to draw the powder from a powder feed system. The charged powder suspension passes through a gun barrel with an aspect ratio in excess of 2.5 and then enters a space charge section of the chamber. A deflection cone at the opening of the gun causes the powder to disperse in many directions, and this contributes to the turbulence that helps to provide the uniform coating. Further uniformity is attained by using several guns. Dilution air enters the gun near the electrodes to prevent accumulation of powder on the electrodes and to insure that the mass ratio of powder to air remains within safe limits.

A powder feed system for guns includes a housing for the powder and a piston at the surface of the powder. The piston has a central opening, spiral grooves on its periphery, and a feed tube connecting the central opening to the gun. Reduced pressure in the tube and piston opening draws the powder into the gun as air drawn through the spiral grooves and past the outer surface of the piston forms a powder suspension at the undersurface of the piston. This system provides an economical and efficient means for powder fluidization. Where several guns are used, the powder feed system may have several pistons within the container, each feeding a separate gun. If necessary, devices such as a rotating rake are provided for maintaining the upper powder surface level and loose where the powder is fluidized.

Conducting articles that have been grounded to provide a discharge path for the charged particles precipitating to the surface and reversely precharged nonconducting articles are essentially neutral when they leave the exhaust section. Two coating chambers may be joined at their exhaust sections, each providing charged powder of the same or opposite polarity. This increases the distance during which the articles are coated and in the case of opposite polarity gives further assurance that the articles, upon leaving the system, have little or no net charge.

Multiple gun and powder systems, each for a different powder, permit rapid powder change. These may be alternately connected to common dilution air sources by appropriate switching.

The efficiency of the system is very high; recycling of virgin particles is not necessary. The system is compatible for assembly line coating of articles of many sizes and shapes Coating thickness is controllable to less than 1 mil by regulating the article speed, the number of guns, the particle mass delivery rate per gun, the chamber length or chamber dilution air rate.

BRIEF DESCRIPTION OF THE DRAWINGS

For a better understanding of the invention, reference may be made to the following description of preferred embodiments, taken in conjunction with the accompanying drawings, in which.

DESCRIPTION OF PREFERRED EMBODIMENT

The Coating Line

Figure 1:
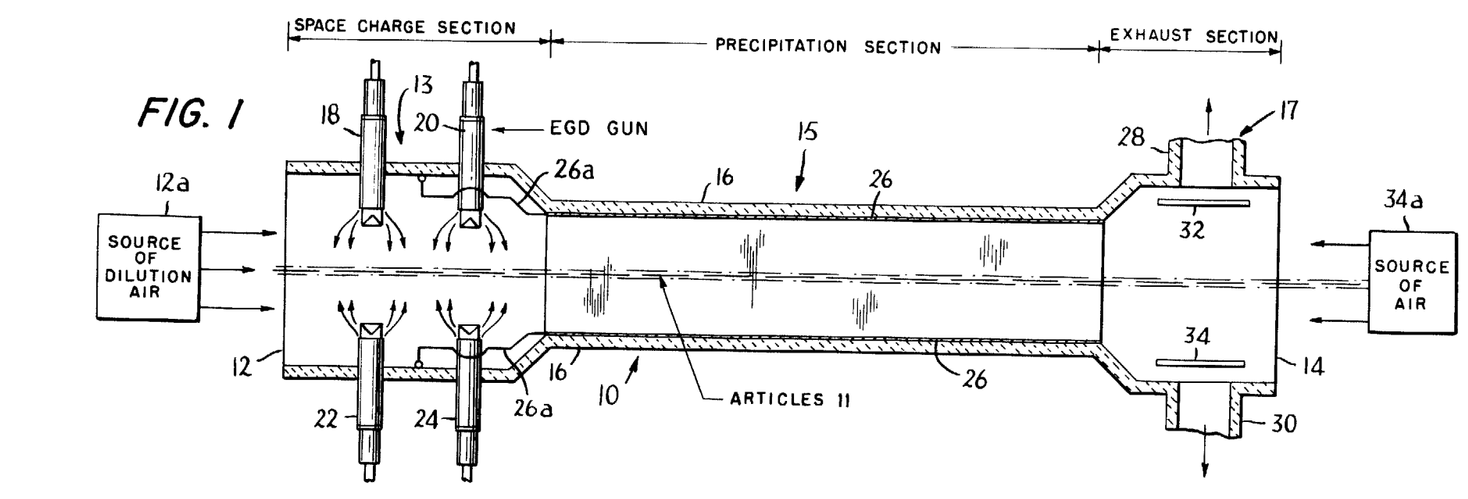
FIG. 1 is a plan view in partial section of a coating chamber with electrogasdynamic guns mounted in place.

In a preferred embodiment of an electrogasdynamic production line coating system according to the present invention, as shown in FIG. 1, a coating chamber 10 receives a series of articles 11 through an opening 12 and coats the articles as they move downstream. The system can coat the articles with any of various powders, including paint. The articles leave the coating chamber 10 through an opening 14.

The chamber 10 has a space charge section 13, a precipitation section 15, and an exhaust section 17. The chamber may have any of variously shaped cross sections, for example, circular, but to permit adjustment of its width or height a rectangular cross section is preferred. The variation of the width or height permits control of the electric fields driving the charged particles to the articles, minimization of powder that settles to the bottom of the chamber by gravity, and accommodation of the chamber for variations in article size and shape.

In FIG. 1, the precipitation section 15 is somewhat smaller in cross section than either the space charge or exhaust sections 13 and 17. The shape of the coating chamber 10 is defined by walls 16 with interiors of a substantially nonconductive material.

A series of electrogasdynamic or EGD guns 18, 20, 22 and 24 projects through the sidewalls 16 of the space charge section. Each EGD gun emits a cloud of electrogasdynamically charged particles, particles raised to high potentials by the deceleration of flow of a dielectric gas carrying charged particles. The kinetic energy of the flowing gas carrying the ions is exchanged for an increase in electrical energy. The space charge field of the cloud and the field between the charged cloud and the articles drive the charged particles onto the grounded or oppositely charged articles.

Dilution air supplied from a source 12a enters the entrance opening 12 of the coating chamber 10. This prevents the cloud from escaping through the opening 12 and causes the cloud to move downstream with the articles.

Figure 4:
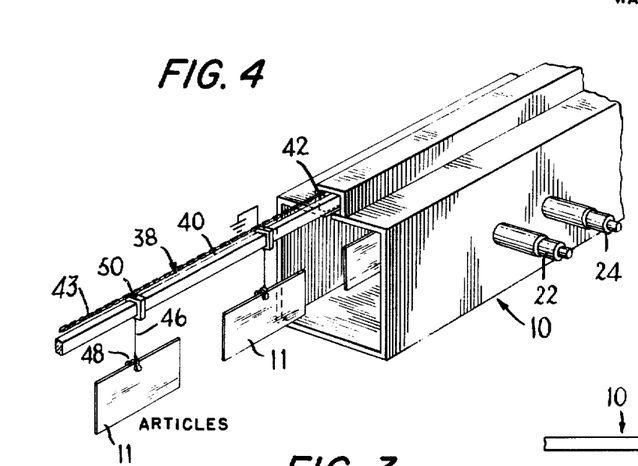
FIG. 4 is a partial perspective view of the coating chamber with a conveyor system for passing articles through the coating chamber.

If conductive, the articles are preferably grounded through a conveyor system such as that shown in FIG. 4. The charged powder discharges, leaving the articles neutral as they leave the opening 14. Grounding the article also prevents a distribution of like charges along the outermost surfaces of an article to establish an electrostatic screen effect preventing the entrance of charged particles into recesses.

Figure 2:
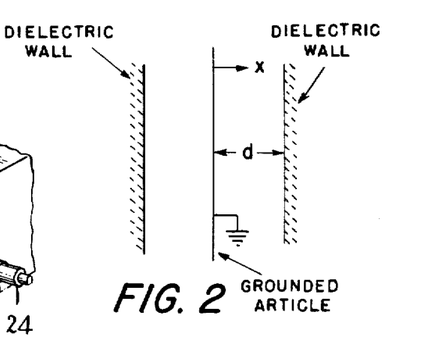
FIG. 2 is a diagram indicating the position of the articles with respect to the nonconducting walls of the coating chamber.

The mathematical relationships governing the performance of the space charge section 13 are shown below and further developed in FIGS. 2 and 3. Looking at a cross section of the chamber as in FIG. 2, $$(dE_x/d_x) = (qn_x/\epsilon_o)$$

where $\frac{dE_x}{d_x}$ = differential electrical field intensity gradient in the $x$ direction q = charge/particle
n = particle/unit volume
$\epsilon_o$ = permitivity of free space ($8.87 \times 10^{-12}$ farad/meter).

Integrating:

$$E_x = (qn_x/\epsilon_o) + C_1$$

$$V = -\int E_x d_x = -\frac{qnx^2}{2\epsilon_o} - C_1 x + C_2$$

Boundary conditions are:

$E(d) = 0$, no current to the dielectric wall, and $V(o) = 0$, grounded articles.

Therefore,
$C_1 = (qnd/\epsilon_o)$
and
$C_2 = 0$

Substituting, $$E_x = -\frac{qnd}{\epsilon_o}(1 - \frac{x}{d}), \text{ and}$$

$$V_x = \frac{qn}{\epsilon_o}(dx - \frac{x^2}{2}).$$

Figure 3:
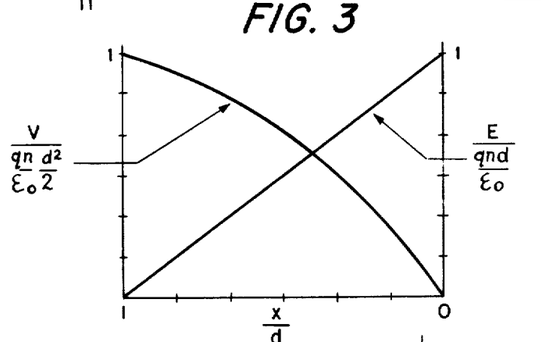
FIG. 3 is a graph indicating the relationship between voltage (V) and field intensity (E) as a function of position parameters illustrated in FIG. 2.

FIG. 3 shows the normalized curves for these last two equations. Thus, the electric field driving the charged particles to the grounded articles has a value ($qnd/\epsilon_o$) at the article. The voltage that the space charge section wall rises to is ($qnd^2/2\epsilon_o$).

Preferably, the precipitation section 15 has a coating 26 of a conducting material on the interior of the dielectric walls 16 that extend from the space charge section to the end of the precipitation section. Safety requirements may prevent the application of any voltage to the walls of the system, in which case the interiors may be dielectric or left to float, electrically unconnected. However, better operatin results if a high voltage of same polarity as the charged particles is applied to the coating 26. A probe 26a into the space charge section is an especially suitable means for applying a voltage to the coating 26. The high space charge field induces a voltage ($qnd^2/2\epsilon_o$) on the probe and along the coating 26 of the precipitation section. This voltage contributes to the field that precipitates the charged particles onto the articles in the precipitation section and opposes precipitation of the charged particles onto the wall. At the downstream end of the precipitation section field intensity ordinarily would be less as a result of most of the charged particles having discharged by precipitating to the grounded articles, but the high voltage applied to the conductive interior coating 26 provides a high field intensity along the length of the precipitation section for a more efficient use of the system.

For efficiency, it is desirable to keep d, the half width of the precipitation section, as small as possible. Movable walls are available for this reason.

The exhaust section 17 has a pair of exhaust conduits 28 and 30. These permit the dilution air from the opening 12 to be exhausted. The exhaust section is larger in cross section than the precipitation section to prevent local turbulence near the mouths of the exhaust conduits from blowing deposited particles from the articles 11. Suitable baffles 32 and 34 mounted in front of the openings for the exhuast conduits 28 and 30 also help keep local turbulence from the articles. The interior of the exhaust section is nonconductive to prevent the walls competing with the articles for the charged particles. A source of air 34a directs air into the exhaust section to prevent waste dilution air from further moving with the articles and to force the waste dilution air to pass through the exhaust conduits 28 and 30.

Figure 5:
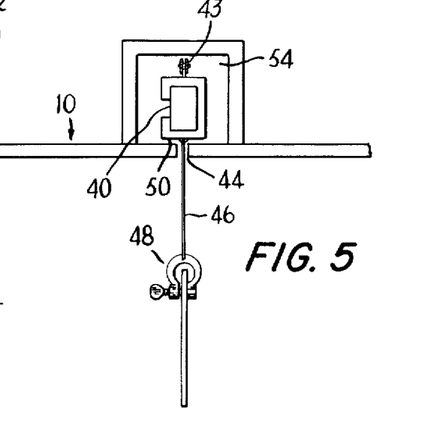
FIG. 5 is a schematic diagram indicating the interrelation of workpiece, conveyor and support.

Referring now to FIGS. 4 and 5, the articles to be coated are preferably conveyed by an overhead conveyor 38 through the coating chamber 10. A support rail 40 is housed in a recess 42 above chamber 10. The coating chamber 10 has a slit 44 along the length of the chamber to permit an arm 46 or other convenient transporting member to extend into and move along the length of the chamber 10. A sliding connector 50 slidably connects the arm 48 on the rail 40. The arm 46 supports at its lower end some suitable fastener, such as a C-clamp 48, which holds an article 11. The support rail 40 is preferably dielectric to avoid attracting charged particles. The fixtures 50 can be moved along the rail 40 by any conventional conveyor drive for example, the chain drive 43, schematically shown. If conductive articles are contemplated any suitable arrangement may be chosen for grounding the article through the conveyor drive 43.

Figure 15:
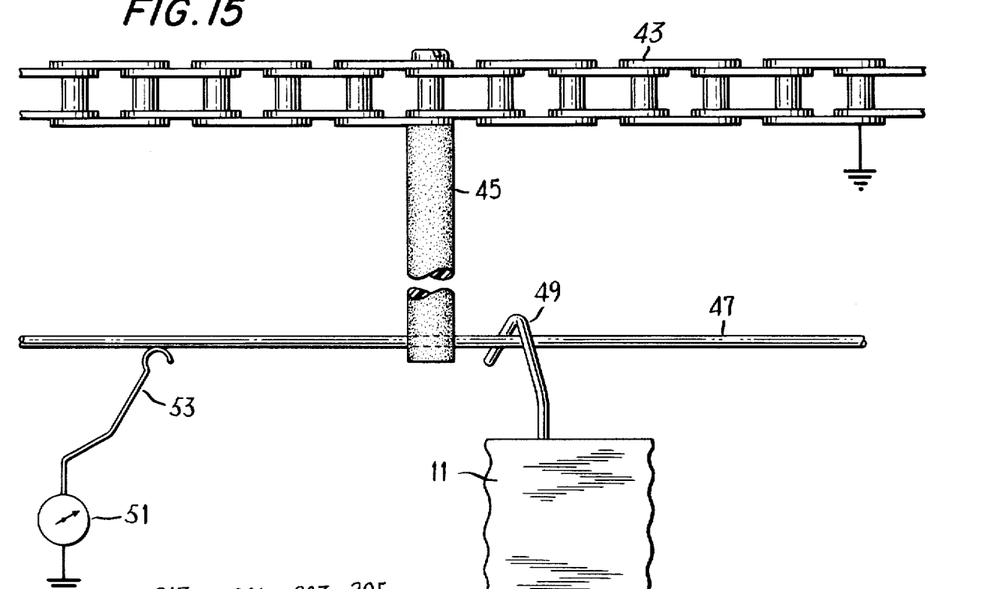
FIG. 15 is a fragmentary elevational view of an alternative embodiment of a suitable conveyor system.

FIG. 15 shows a embodiment of a conveyor that permits the total current collected by the articles to be measured. In this embodiment, the recess 42 can be omitted, but the slit 44 is present. A grounded, upper chain drive 43 moves the article 11. A dielectric rod 45 is connected to the chain drive. A series of the rods 45 connects to a cable 47 from which the articlels suspend, attached as at 49. An ammeter 51 is electrically connected between ground and, via a brush 53, the cable 47.

Since the rod 45 is dielectric, current from the articles 11 passes through the ammeter 51. Because the current flowing from the articles or workpieces is in proportion to the charged particles applied thereto, this arrangement is a convenient method of monitoring the rate of coating. The rod 45 separates the chain drive from the area of powder deposition and prevents the accumulation of powder on the chain drive which could eventually be fused solid in the baking oven. For this purpose the series of rods may be made as long as practicable.

Figure 14:
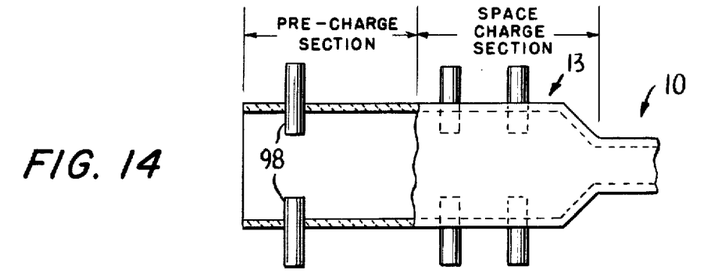
FIG. 14 is a diagrammatic illustration of an alternative form of precharge section.

The arrangements according to FIGS. 14 and 15 can be used to facilitate coating of certain dielectric workpieces as well. A grounded backing underlying the surface to be coated may be grounded by either of the embodiments illustrated.

The EGD Gun

Figure 6:
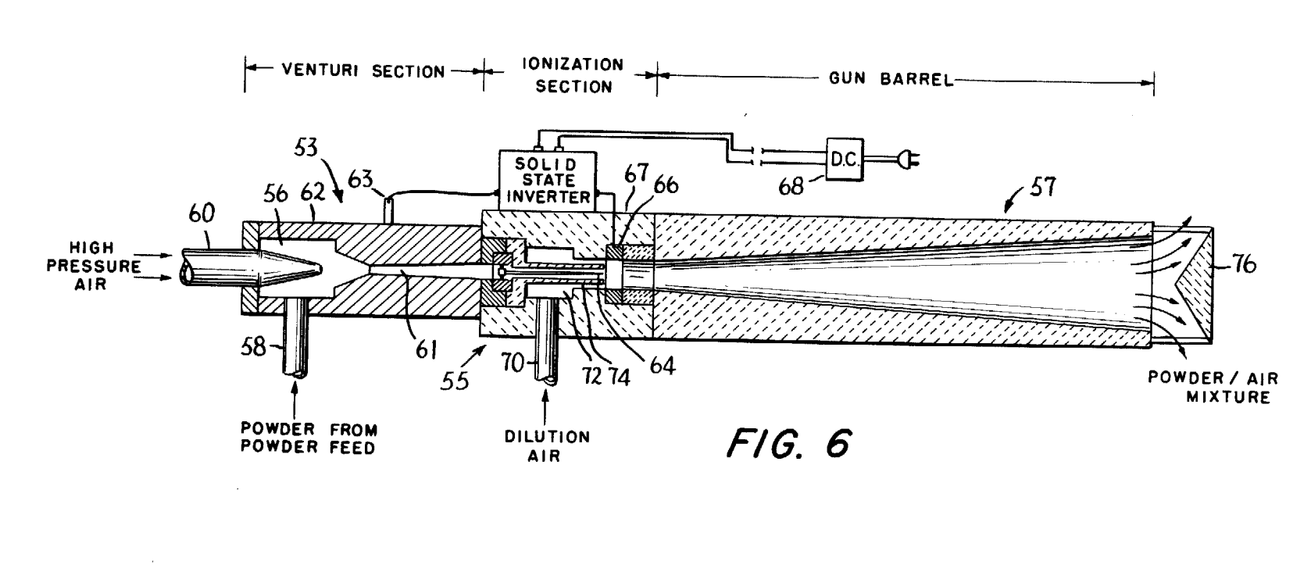
FIG. 6 is an elevational view in partial section of an electrogasdynamic gun suitable for use in the system with parts shown schematically.

Referring now to FIG. 6, which shows an embodiment of one of the EGD guns 18, 20, 22 and 24 previously mentioned in reference to FIG. 1, the EGD gun comprises a venturi section 53, an ionization section 55, and a gun barrel 57. The venturi section 53 provides a local low pressure region in a chamber 56 which draws powder from a feed tube 58 (shown partially) that is connected to a powder feed system. Clean, dry, high pressure air is delivered through a small nozzle 60 into the chamber 56 to create the low pressure region. A housing 62 for the venturi section is fabricated from an electrically conductive material and is grounded at 63. Grounding helps minimize the triboelectrification of the powder. The suspension of powder in air flows through a channel 61 in the housing 62 and enters the ionization section 55.

The ionization section 55 is that part of the EGD gun where the powder becomes charged and dilution air is mixed with the charged powder suspension to keep the mass ratio of powder to air within safe limits. A corona discharge is sustained off a grounded needlepoint 64 by the application of high voltage to an attractor ring 66. The voltage applied to the attractor may be positive or negative depending on which gives better charging characteristics for various types of particles. As the molecular ions produced in the immediate vicinity of the needlepoint 64 travel to the attractor ring 66, they collide with the powder particles and charge them.

Figures 16, 17:
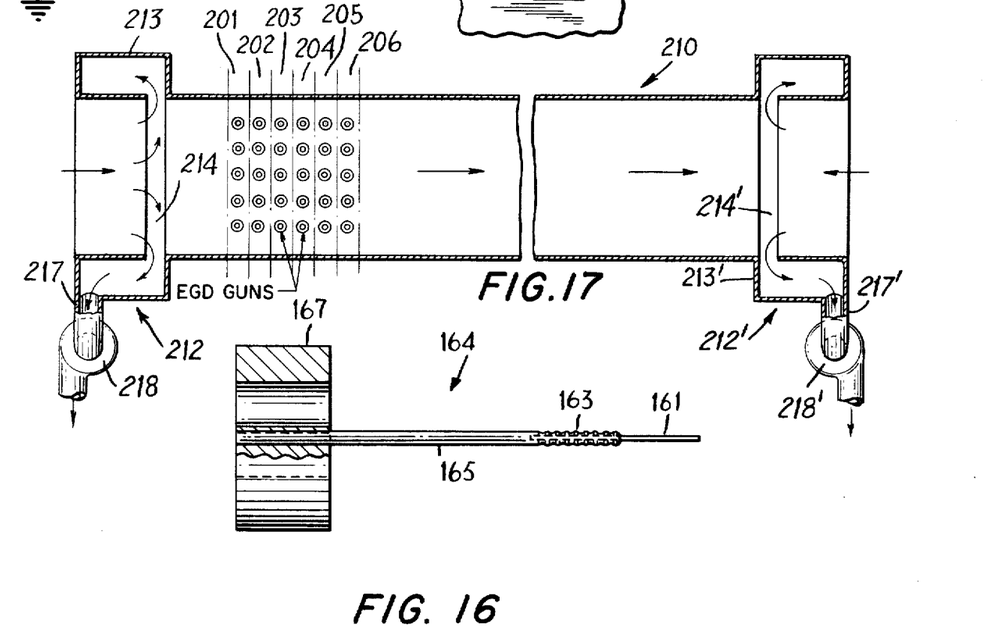
FIG. 16 is an elevational view, partly in section of an alternative embodiment of a corona electrode.
FIG. 17 is a schematic illustration of a system with multiple gun banks and a means of slowing air drawn into the system at fairly high speed.

FIG. 16 shows an alternative corona needle embodiment, the cat whisker ionizer 164. This may be used instead of the needlepoint 64. For example, stainless steel rod 161 about 0.013 inches in diameter is crimped in place at 163 in stainless steel tubing 165 about 0.028 inches in diameter. The tube 165 is fitted into a base 167. This ionizer has increased the lifetime of the corona discharge from less than an our to an indefinite period. Needle shaped ionizers rapidly cause an insulating coating on the attractor electrode or on the needle itself. The cat whisker ionizer 164 does not, primarily because it maintains its shape at the tip despite gradual erosion, and it vibrates slightly in the turbulent air flow keeping itself clean. In contrast, needles are stiff, and their tip quickly become blunt due to erosion.

The electrical drive for the EGD gun is a standard D.C. supply capable of delivering about 25 microamperes at 6,000 volts. The supply includes a suitable current limiting resistor. The polarity and magnitude of the voltage are variable in order that the electrical parameters may be varied to give the optimum particles charging efficiency for various particle types and to produce a minimum amount of particle accumulation on the corona electrodes of the EGD gun. Where an array of EGD guns is utilized, one power supply may energize the array, in which case the supply should have individual current limiting resistors to help balance the load. Suitable ammeters and voltmeters in the circuit will monitor current and voltage as required.

An alternative power supply is an individual solid state inverter mounted on the gun itself as shown in FIG. 6. A remote D.C. supply 68 provides a low voltage to the inverter. The inverter then converts the low voltage to the required 6,000 volt level. This alternative form eliminates the high voltage cable from the standard supply to the EGD gun.

In the gun of FIG. 6, dilution air under pressure is brought into the ionization section not only to reduce the power to air mass ratio, but to help keep surfaces of the attractor ring 66 relatively free of powder accumulation, as well. The dilution air from a conduit 70 enters a cavity 72 in the ionization section inside a dielectric housing 67 and then flows out through an annulus 74, across the exposed surface of the attractor ring 66. With careful design of the cravity 72 and annulus 74, this dilution air flow can be substituted for that from the small nozzle 60 into the channel 61, such that a low pressure region is created in the chamber 56 which draws powder direct from the feed tube 58 that is connected to a powder feed system.

The gun barrel 57 is basically a diverging EGD channel with an aspect ratio of greater than 2.5. The advantage of this arrangement are described in U.S. Pat. No. 3,673,463. The channel, which is also dielectric, is divergent to keep the exit velocity of the powder air mixture below that value at which the particles will bounce off the articles in the coating chamber 10 due to high impact inertia.

Positioned at the mouth of the gun barrel 57, a dielectric deflection cone 76 minimizes the inertial delivery of the particles to the articles with a corresponding increase in the electrodynamic delivery. In other words, the cone prevents the particles from being driven directly toward and into contact with the articles because the cone disperses the particles in many directions into the cloud of particle that surrounds each article. The cone increases electrodynamic delivery because the charged particles are electrically precipitated onto the article. Because the cones 76 uniformly disperse them, the particles coat the entire surface of the articles. The cone 76 may have any of various cross-sectional shapes and orientations that are found to facilitate the powder delivery to various article sizes and shapes. Different cones are easily interchangable on the gun barrels.

The Powder Feed

Figure 7:
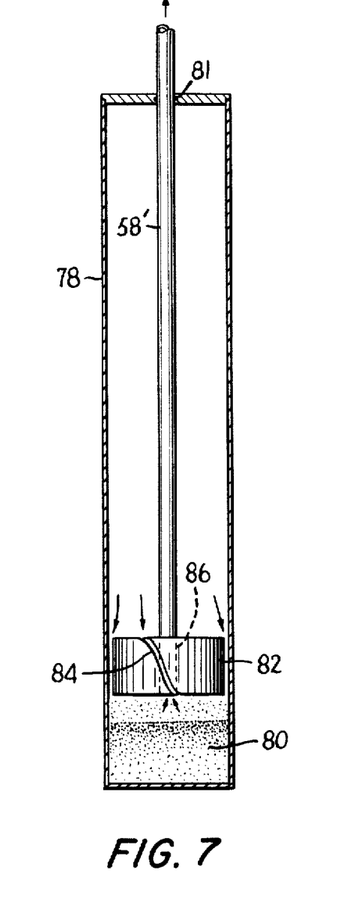
FIG. 7 is an elevational view in partial section of one embodiment of a powder supply for a single EGD gun.

In FIG. 7, the powder feed system has a cylindrical housing 78 which contains a quantity of powder particles at 80. A piston 82, having a spiral circumferential groove 84 and a central opening 86, is mounted on hollow rod 58' whose interior communicates with the feed tube 58 of FIG. 6. The low pressure at the venturi section draws the powder through the central hole 86, into the rod 58', and through the feed tube 58. The pressure differential across the piston 82 draws air through the spiral groove 84, and about the periphery of the piston as shown by the arrows of FIG. 7. Because the spiral groove enters the location of the mass of powder aslant the upper powder surface, the air passing through the spiral groove 84 enters the region below the piston 82 with high downward and tangential velocities to fluidize the powder at its surface. This air and that which enters about the periphery of the piston agitate the particle means 80 to form a suspension directly under the piston.

The piston 82 and rod 58' are relatively vertically displaceable with respect to the housing 78. Particle delivery is controlled by the pressure at the venturi, and the rate of relative advancement of the piston 82 in the housing 78. The rate of this advancement may be controlled either by moving either the piston or the housing. An advantage of this system is the easy minimization of contamination of the powder due to the closed structure of the housing 78. A tight bearing 81 minimizes the entrance into the system of contaminating dust. Elimination of contamination of the powder of course can be achieved by incorporating an air filter on the cylindrical housing wherever entry of air into the housing occurs.

Figure 8:
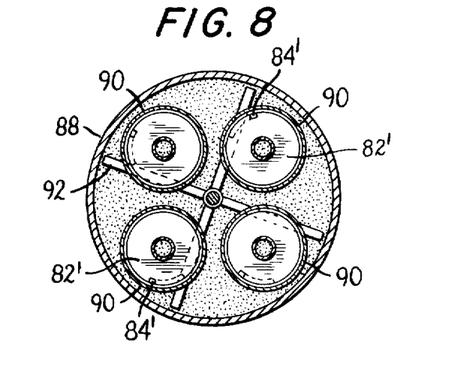
FIG. 8 is a plan view of a powder supply capable of feeding a plurality of EGD guns.
Figure 9:
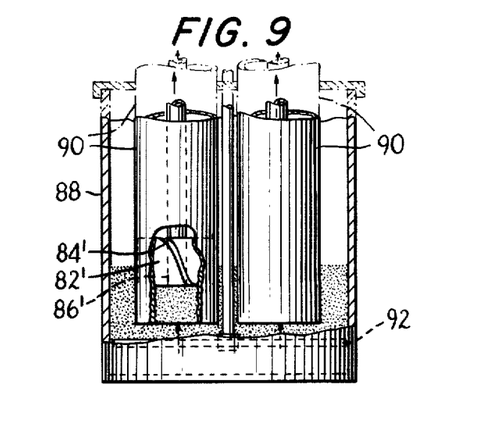
FIG. 9 is an elevational view in partial section of the supply shown in FIG. 8.
Figure 10:
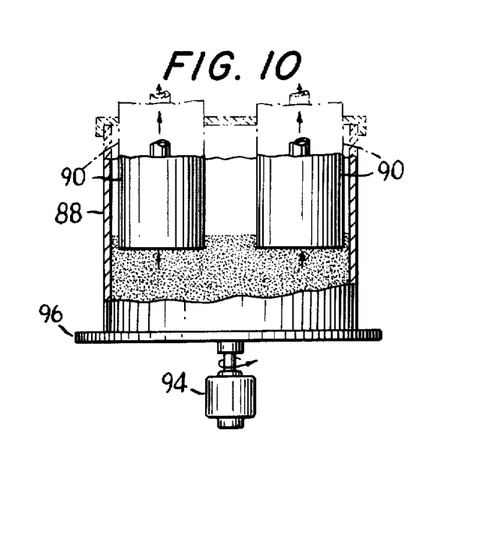
FIG. 10 is an elevational view of an alternative embodiment of the powder supply for plural EGD guns.

In FIGS. 8, 9 and 10, powder feed systems are shown capable of use with a multiple EGD gun array. All or some of the guns in the array can receive the powder from one source, which may itself be a shipping container 88. Each piston 82' has a central hole 86' and a spiral groove 84'. A cylindrical section 90, communicating with atmosphere, is placed around the piston 82' in a manner similar to the housing 78 of FIG. 7. The piston 82' and the cylindrical section 90 act as a unit and draw out the powder by the technique previously described in reference to FIG. 7.

When the nature of the powder is such that fluidization is not sufficient to maintain a fairly uniform powder level, a rotating rake 92, in FIGS. 8 and 9, or a drive mechanism 94 rotating the container 88, FIG. 10, assures a uniform level. The FIG. 10 drive mechanism 94 rotates a platform 96 which supports the container 88. The rake 92 may be rotated by any convenient mechanism (not shown). As with the powder feed system shown in FIG. 7, the systems of FIGS. 8, 9 and 10 have the advantage that there is little chance for contamination because there is no need to open the container and load the powder into a separate powder supply.

Figure 11:
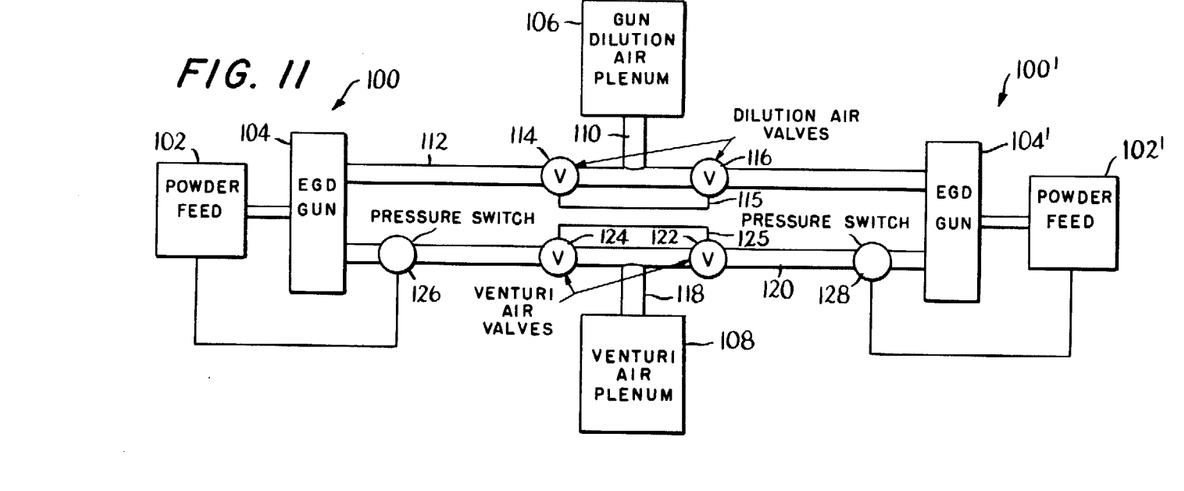
FIG. 11 is a block diagram showing connections between powder feed system, EGD guns, and dilution air plenums to facilitate rapid change of powder type.

FIG. 11 shows an arrangement that permits a rapid change of powder. This arrangement is especially useful in production lines like those for automobiles where each car body might be painted a different color. Essentially, a set of EGD guns and a powder feed are used for each type of powder. These are relatively inexpensive, particularly in relation to the expense of cleaning a system for use with a new powder.

In FIG. 11 two EGD gun sets, 100 and 100', are shown. Set 100 has a powder feed 102 and an EGD gun array 104. Similarly set 100' has a powder feed 102' and an EGD gun array 104'. Plenums 108 and 106 supply air for the venturi section and for the ionization section of the EGD guns respectively. They are common to sets 100 and 100'. Air flows from the plenum 106 through a common line 110, through a branch line 112 to either of guns 104 and 104'. Tandem valves 114 and 116 are positioned in the line 112 on opposite sides of a connection with the common line 110. A coupling 115 assures that when one valve is open the other is closed. Another common line 118 supplies air to the venturi of the selected one of the guns 104 and 104' via a branch line 120. The line 120 has tandem 124 and 122 positioned therein to direct air to the selected gun, and interconnected by a coupling 125 to allow only one to open at a time.

Pressure switches 126 and 128 in the line 120 activate the drive mechanism of the associated powder feed system. The powder supplies for the EGD guns 104 and 104' may be common or separate, depending on whether the powder change necessitates a change in gun voltage or in polarity. The EGD guns 104 and 104' may be permanently mounted on the coating chamber or movably mounted to allow, for example, guns 104 to be inserted into the coating chamber while the guns 104' were being withdrawn. Powder changes usually can be effected without cleaning the coating chamber 10.

After a lengthy run with one powder there may be considerable accumulation on the bottom of the chamber 10. The chamber dilution air flow can be increased to sweep the loose powder into the exhaust system. In addition, a large central baffle (not shown) conveyed through the chamber while dilution air is forced through will cause the air to flow around the baffle and at increased velocity past the inner boundaries of the chamber, sweeping the chamber walls. If necessary, brushes on the baffle can dislodge thick layers of impact powder.

Modifications of the Coating Line

The wide applicability of the coating technique according to this invention permits modification of the basic preferred coating line embodiment described below. Particular modifications valuable for specific purposes follow.

Multicolor Line With Air Flow Control

FIG. 17 shows schematically a coating chamber 210 for coating serially conveyed articles with different powders. Six EGD gun banks 201 to 206 are shown. They are spaced apart axially. An upstream air withdrawal system 212 includes a jacket 213, withdrawal openings 214 opening out of the chamber 210, and an air removal connection 217 adapted for use with an exhaust blower 218 to cause air removal in the indicated direction. At its downstream, or exhaust, end a very similar air withdrawal system 212' takes air out of the chamber 210 by similarly numbered provisions.

Assuming that an article conveyance speed of 20 ft./min. is selected, the rates of air taken from the chamber by the withdrawal systems 212, 212'' are adjusted to give a 20 ft./min. air flow rate down the chamber. This is necessary to segregate differently colored particle clouds when painting each article a different color. To achieve and maintain this flow condition, the speed of both blowers 218 and 218' should be increased equally until the intake air speed is greater than 60 ft./min. at both the entrance opening and the exit opening; then one can increase the speed of the fan of the withdrawal system 212' until downstream air flow in the chamber reaches 20 ft./min. The flow of air down the chamber and into the entrance and exit opening can be monitored by aerometers and correct flow can be maintained automatically by a suitable chosen electro mechanical servo system. Whichever bank of guns emits its cloud of charged powder, the powder accompanies the article down the chamber while precipitation occurs. Safety standards that require, for example, a 60 ft./min. air intake at any opening into the chamber are satisfied as well. A powder supply system like that of FIG. 11 may be used to control the EGD guns of the bank 204 to 206. An automatic, simple and safe powder coating method and system is the result. Additional air flow controls can be employed in accordance with accepted procedures. For example, the size of the entrance and exit openings, as well as that of the chamber cross-section, may be selected to alter the air velocity.

To separate clouds of different powders, different colors for example, a gun can first shoot a blast of clean air, before emitting the different powder to precipitate to the next article. This method can be accomplished with the arrangement of FIGS. 11 and 17. There are produced powder clouds separated by layers of clean air. Commonly the clouds will be of like charge and repulse each other. If however, the layers of clean air prove insufficient to prevent the mixture of powders, barriers such as baffles can be carried by the conveyor system between articles 11.

JOINED CHAMBERS

Figure 12:
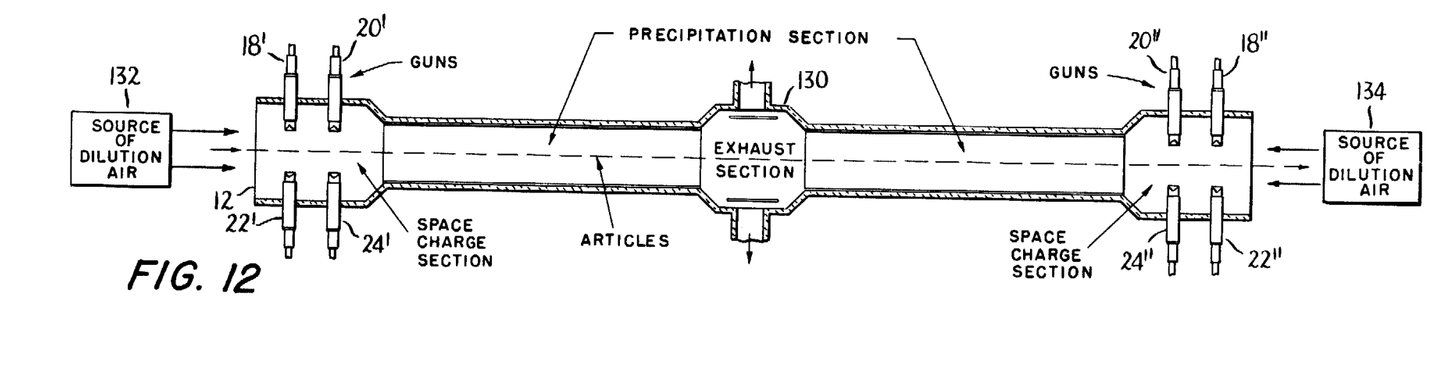
FIG. 12 is a plan view in partial section showing an alternative embodiment of the coating chamber shown in FIG. 1.

Referring to FIG. 12, a pair of coating chambers, as previously described in reference to FIG. 1, join together at a common, central exhaust section 130 to form a unitary dual coating chamber. Two sources 132 and 134 supply dilution air from opposite ends of the chamber. Both chambers function as previously described except that the articles move against the air flow in the second chamber. Of course, the similar joined coating chambers can be used for the same polarity coating in each section. Furthermore, the arrays of EGD guns 18', 20', 22', 24', and 18'', 20'', 22'', 24'' can emit powder particles that are oppositely charged, in which case the article attract particles of both polarities. Appropriately controlled, this second arrangement has the advantage of prohibiting a net charge on the coated article. A charge accrual tendency exists, for instance, if the articles are nonconductive or if there is no sufficient low resistance path from conductive articles to ground.

Precharging

Figure 13:
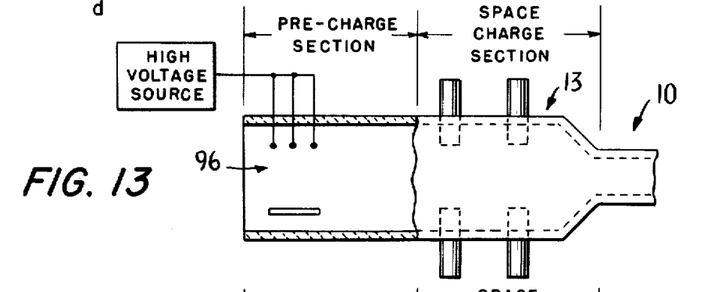
FIG. 13 is a diagrammatic illustration of a precharge section.

FIGS. 13 and 14 show other modifications for coating nonconductive articles. Dielectric articles may be given a precharge of opposite polarity of the powder by an appropriate charging apparatus upstream of the coating chamber 10. The precharging apparatus may consist of conventional devices such as a corotron 96, shown schematically in FIG. 13, or additional EGD guns 98, FIG. 14. The precharged article attracts the charged powder until all the precharge is neutralized at which time no further coating takes place. To enhance the coating action, when a final residual charge on the article can be tolerated, the articles may be precharged to a level substantially higher than will be neutralized by the coating powder. So treated, the dielectric articles act like grounded metallic articles.

In Conclusion

Several easy adjustments permit coating control in any of the arrangements described. Decreasing conveyor speed, increasing mass delivery of powder, increasing the number of guns or the coating chamber length all increase coating thickness. If the particle mass delivery rate is increased, the chamber dilution air volume flow rate must be increased to maintain a safe powder to air mass ratio.

Because, in the embodiments of this invention, powder is driven onto the articles from an electrogasdynamically produced high potential space charge cloud rather than by inertial delivery, gun positioning is not nearly as critical. Nevertheless, if fairly substantial article size or shape changes are contemplated, it will be wise to alter the gun positions to obtain a high transfer efficiency. In this situation, various known movable mounts may allow for axial, lateral and angular movement of the EGD guns. In addition, if required uniformly to coat large items with a few guns, a reciprocating gun mount may be used. Whereas the foregoing preferred embodiment is described in relation to powders, that is, solid or dry particles, many of the arrangements and methods of the invention are of broader applicability and, for that reason, certain of the appended claims refer not to powders but, more broadly, to particles. EGD coating with various materials is described in the art, in particular see the aforementioned U.S. Pat. No. 3,673,463 of Meredith C. Gourdine. Those skilled in the art will be able to make numerous modifications of the exemplary embodiments of this invention without departing from the spirit and scope of the invention. All such modifications are intended to be included within the scope of the invention as defined in the appended claims.

We claim:

1. A production line coating system including means for moving articles to be coated along a predetermined path of movement, a coating chamber through which said path extends, said chamber having a space charge section, a precipitation section, and an exhaust section, said space charge section including means for producing a cloud of charged particles at electrogasdynamically raised high potentials, and gas moving means for moving gas through the chamber in the direction of article movement to thereby move said substantially intact cloud of charged particles at a correlative speed with said articles in said precipitation section to increase the time for attraction between the high potential particles and the moving articles.

2. The production line coating system according to claim 1 wherein said coating chamber has an opening at a first end for receiving the articles and has an opening at a second end for permitting the coated articles to exit, the coating chamber space charge section receiving the charged particles is near the first end, and said means for moving gas being located to flow gas from the first end through the precipitation section of the coating chamber at substantially the speed of article movement towards the second end to cause the cloud to move with at least one associated article at substantially the same speed therewith.

3. The system according to claim 2, said precipitation section having dielectric chamber walls, and including a conductive interior on said walls intermediate the charged particle cloud producing means and said exhaust section, the system further including means for applying a high potential on the conductive interior.

4. The production line coating system according to claim 1 wherein the means for producing a cloud of charged particles includes at least one electrogasdynamic gun having means for charging particles of coating material passed therethrough and a section wherein the charged particles are raised electrogasdynamically to high potentials.

5. The production line coating system according to claim 4 further including means for producing a suspension of the particles in a gas and means for delivering the suspension to the gun.

6. The production line coating system according to claim 4 wherein the means for producing a charged particle cloud includes a plurality of electrogasdynamic guns opening into said space charge section to produce a turbulent space charge cloud.

7. The production line coating system according to claim 1 further including means for depositing a precharge on articles to precharge the articles oppositely from the charged particles and substantially equal to the charge applied by the particles thereby to permit discharge of the charged particles upon precipitation to the articles, whereby the coated articles emerge substantially neutralized.

8. A production line coating system including a coating chamber, an entrance opening into the chamber, a plurality of charged particle emitting means, an exit opening, means for conveying articles through the chamber from the entrance opening, past the plurality of charged particle emitting means and out of the exit opening, and a particle supply system including plural sources of particles, means for mixing the particles with a gas to form a suspension, separate delivery means connecting the particle sources with less than all of the particle emitting means, and means for controlling the flow of particles and gas suspension to emitting means to inactivate at least one emitting means when another is activated.

9. The system according to claim 8 wherein each charged particle emitting means is at least one electrogasdynamic gun, said gun including a charging means, an emission opening, and a section between the charging means and the emission opening for increasing the charge on charged particles electrogasdynamically to a high potential, the delivery means includes air and powder suspension delivery lines connected to said guns, and further including dilution air lines connected to said guns, said means for controlling including valves in the air and powder suspension delivery lines and in the dilution air lines for opening and closing said lines.

10. The system according to claim 9 including a coupling between the valves in lines to separate particle emitting means to make remaining lines inoperative when lines from a particle source to another particle emitting means are open.

11. A production line coating system including, means for moving articles to be coated, means for producing a cloud of charged particles of a first type, means for producing a cloud of charged particles of a second type, gas flow means for moving said clouds of charged particles in segregated fashion substantially intact with and at substantially equal speed as the articles to cause precipitation of the particles of a selected type onto articles to be coated with only that selected particle type during movement together, means for alternatively selecting one of the cloud producing means, whereby different articles may be coated with different types of particles.

12. A coating system including a coating chamber, means for moving articles in the coating chamber, at least one electrogasdynamic gun directed into the chamber, a coating particle supply system and means connecting the coating particle supply system to the gun, the coating particle supply system including means for forming a suspension of coating particles in a gas, the gun including a venturi section, dilution gas means for directing gas through the venturi section, the dilution gas means including a first opening into the gun interior for directing a flow of dilution gas into and through the gun, the connecting means including gas and coating particle suspension lines connecting the venturi section to the suspension forming means, and a second opening into the gun for directing the gas and particle suspension into the dilution gas flow, the gun further including coating particle charging means followed by an elongate channel for the passage of gas and charged particles therethrough and into the chamber to form an electrogasdynamically energized high potential cloud of coating particles.

13. The system according to claim 12 wherein the charging means includes a corona needle and attractor electrode, the corona needle including a tubular portion and a thin, vibratory needle portion supported partly within the tubular portions and extending therefrom.

14. Apparatus for production line coating articles in an elongate coating chamber having an entrance and an exit, the apparatus including:
   a. means for moving articles to be coated through the elongate chamber,
   b. means for supplying a mixture of gas and particles for coating the articles,
   c. means for charging the supplied particles in the gas and particle mixture,
   d. means for directing the charged particles along a confined path to the chamber to electrogasdynamically increase the potential on said particles as they move to the chamber,
   e. means for moving air into the chamber at the entrance in the direction of movement of the articles therethrough,
   f. means for moving air into the chamber at the exit opposite the direction of movement of the articles therethrough,
   g. means for withdrawing air from the chamber near the exit to carry out of the chamber air-borne coating particles approaching the exit,
   h. further means for withdrawing air from the chamber near the entrance,
   i. the two means for moving air into the chamber and the two means for withdrawing air from the chamber providing a net air flow down the chamber in the direction of and at substantially equal speed to the article movement through the chamber.

15. A production line coating system including means for moving articles to be coated along a predetermined path of movement, a coating chamber through which said path extends, said chamber having a space charge section, a precipitation section, and an exhaust section, said space charge section including means for producing a cloud of charged particles at electrogasdynamically raised high potentials, gas moving means for moving gas through the chamber in the direction of article movement to thereby move charged particles with said articles in said precipitation section to increase the time for attraction between the high potential particles and the moving articles, said coating chamber having an opening at a first end for receiving the articles and having an opening at a second end for permitting the coated articles to exit, the coating chamber space charge section receiving the charged particles being near the first end, and said means for moving gas being located to flow gas from the first end through the coating chamber to cause the cloud to move with the articles, a conductive interior of the chamber in said precipitation section intermediate the charged particle cloud producing means and the second end, and means for applying a high potential on the conductive interior, the high potential applying means comprising a conductive probe extending from the conductive interior to the space charge section at the location of the charged particle cloud producing means for applying the potential there to the conductive interior.

16. A production line coating system including means for moving articles to be coated along a predetermined path of movement, a coating chamber through which said path extends, said chamber having a space charge section, a precipitation section, and an exhaust section, said space charge section including means for producing a cloud of charged particles at electrogasdynamically raised high potentials, gas moving means for moving gas through the chamber in the direction of article movement to thereby move charged particles with said articles in said precipitation section to increase the time for attraction between the high potential particles and the moving articles, and electrical measurement means for providing an indication related to the amount of the charge applied by the particles to articles.

17. A production line coating system including means for moving articles to be coated along a predetermined path of movement, a coating chamber through which said path extends, said chamber having a space charge section, a precipitation section, and an exhaust section, said space charge section including means for producing a cloud of charged particles at electrogasdynamically raised high potentials, gas moving means for moving gas through the chamber in the direction of article movement to thereby move charged particles with said articles in said precipitation section to increase the time for attraction between the high potential particles and the moving articles, means for placing a precharge on articles to precharge the articles oppositely from the charged particles thereby to permit discharge of the charged particles upon precipitation to the articles, the precharging means being at least one electrogasdynamic gun upstream of the charged particle cloud producing means, whereby the coated articles emerge substantially neutralized from the chamber.

18. The production line coating system according to claim 1, further comprising separating means movable through the chamber between articles being coated for further assuring movement of segregated, substantially intact clouds of charged particles with associated articles.

19. The production line coating system according to claim 18 wherein said separating means comprises barrier members adapted for attachment to said means for moving articles, whereby said barrier members are conveyed between and isolate groups of one or more articles to be associated with individual clouds of charged particles.

20. The production line coating system according to claim 1, wherein said means for producing a cloud includes means for producing a cloud-separating discharge of clean gas between charged particle clouds.

21. The production line coating system according to claim 1, said precipitation section being an elongate portion of said chamber wherein dielectric chamber walls are more closely spaced than in other sections and include means disposed thereon for repelling the charged particles conveyed therepast with the articles.

22. The system according to claim 12 wherein said gun includes a grounded housing section for substantially reducing triboelectrically produced charges on the particles.

23. The system according to claim 13, wherein said needle has a thickness of about 0.013 in. whereby corona discharge from the needle is not interrupted by erosion.

* * * * *